July 7, 1970
R. F. BROERING
3,519,133
FLUID FILTER MEANS
Filed July 9, 1968
3 Sheets-Sheet 1
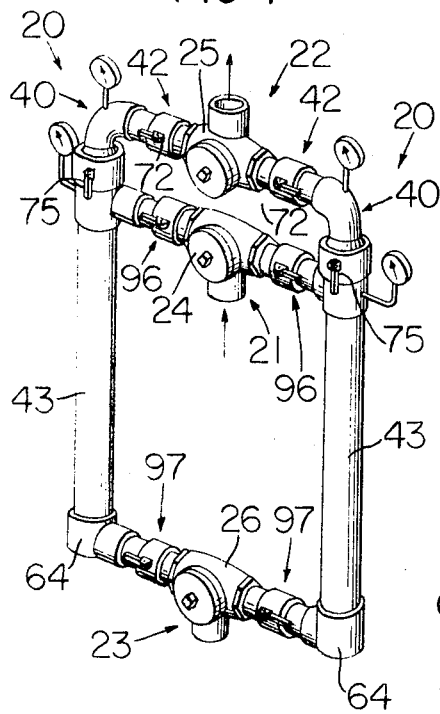
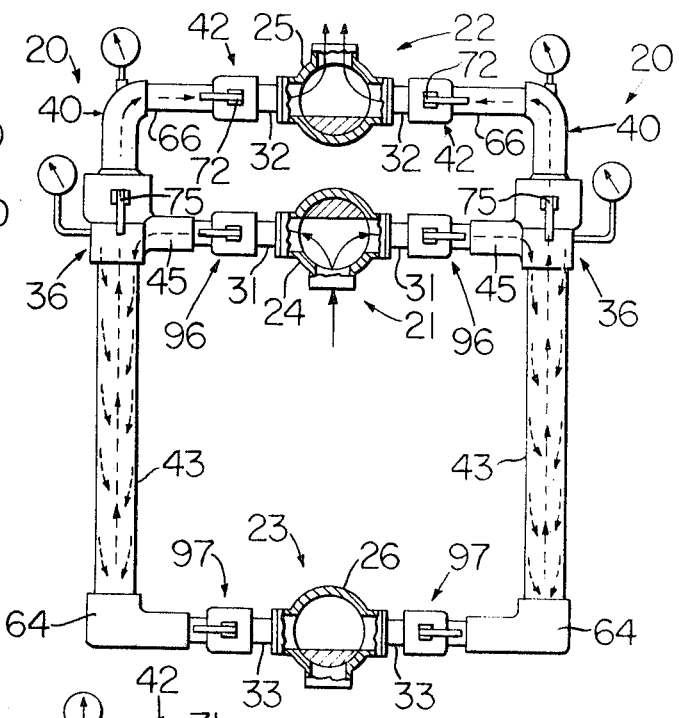
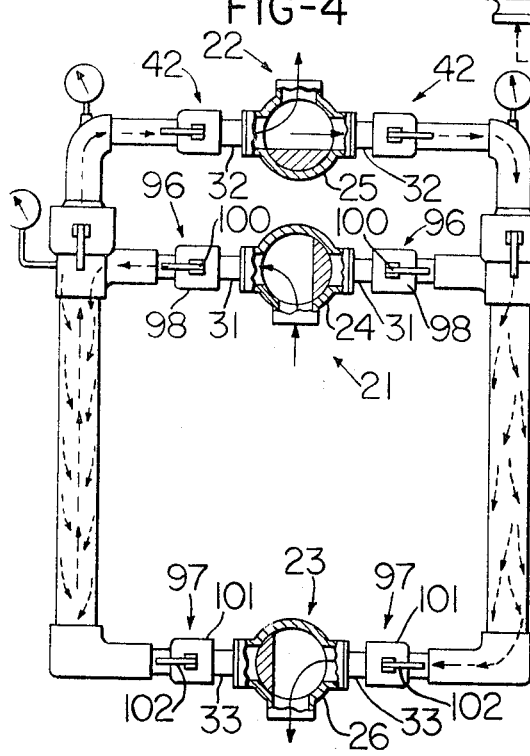
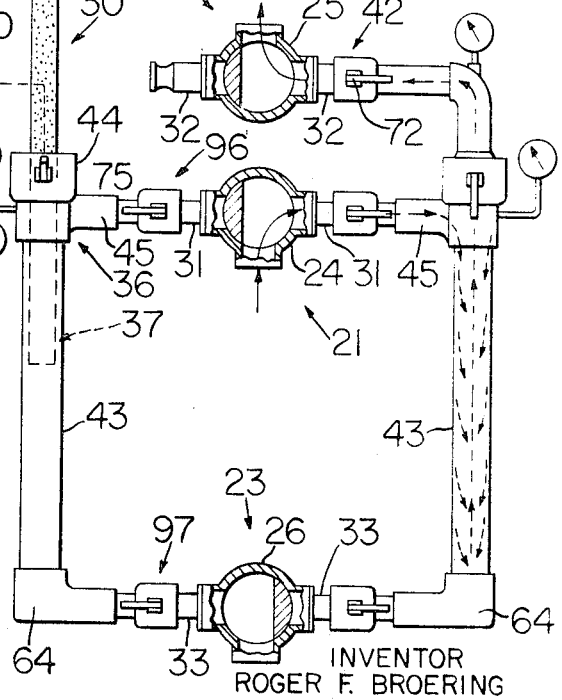
INVENTOR
ROGER F. BROERING
BY Kinney & Schenk
HIS ATTORNEYS July 7, 1970  R. F. BROERING  3,519,133
FLUID FILTER MEANS
Filed July 9, 1968  3 Sheets-Sheet 2

INVENTOR
ROGER F. BROERING
BY Kinney & Schenk
HIS ATTORNEYS

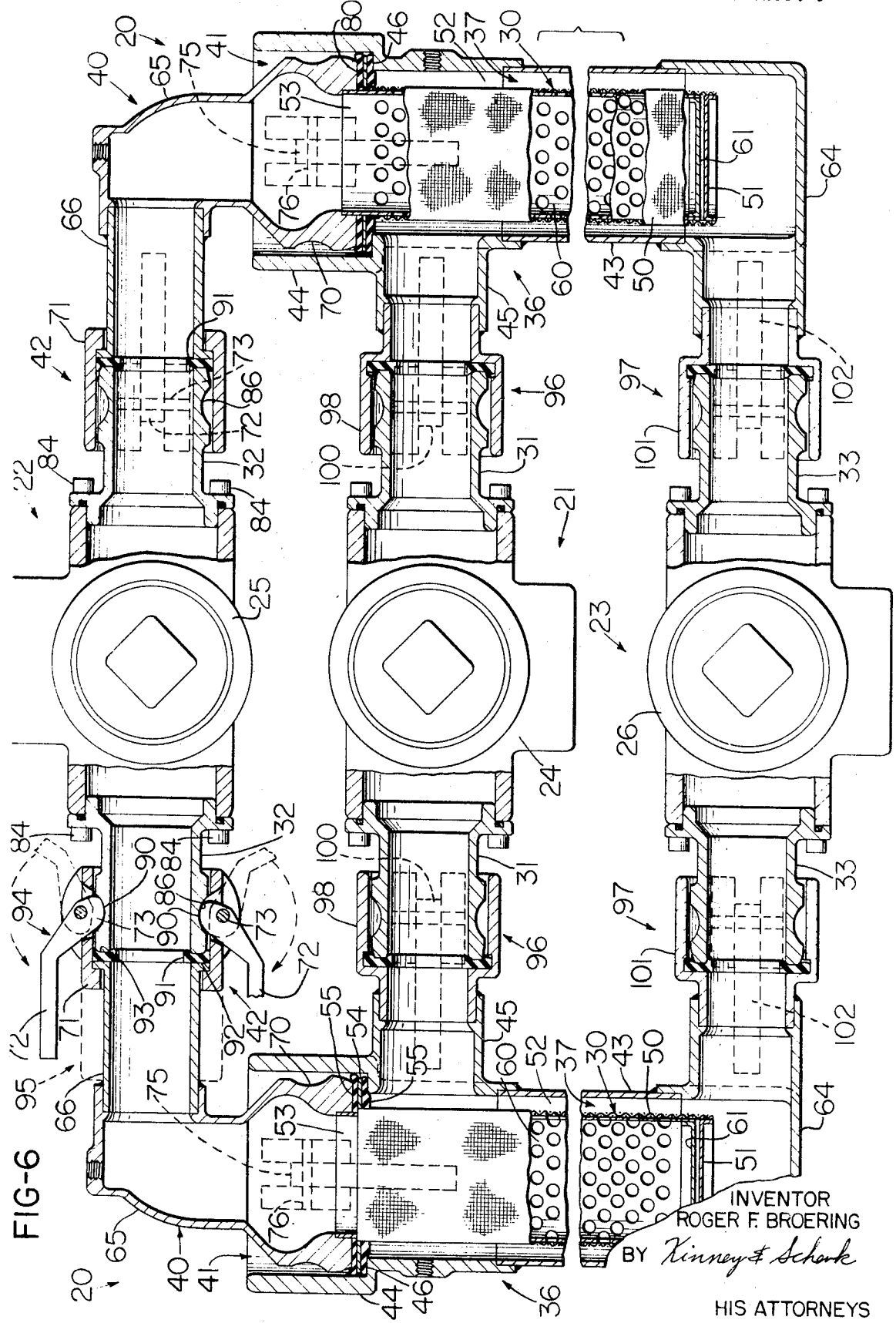

United States Patent Office 3,519,133
Patented July 7, 1970

3,519,133
FLUID FILTER MEANS
Roger F. Broering, Fort Thomas, Ky., assignor to Dover Corporation, Cincinnati, Ohio, a corporation of Delaware
Filed July 9, 1968, Ser. No. 743,498
Int. Cl. B01d 27/08
U.S. Cl. 210—232
12 Claims

ABSTRACT OF THE DISCLOSURE

This disclosure relates to a fluid filter having quick coupling means enabling it to be easily coupled to and uncoupled from an associated fluid system and includes a head assembly which is readily removed while the remainder of the filter and adjoining members are maintained in position, whereby upon removing the head assembly a filter element provided within the fluid filter may be readily removed and replaced.

BACKGROUND OF THE INVENTION

Many fluid filters and in particular liquid filters in current use require that the entire filter assembly be removed from an associated system to replace a filter element contained therein and which becomes clogged during use. Usually this involves considerable delay and makes the operation of the entire filtering system inefficient.

SUMMARY

This invention provides an improved fluid filter which has means provided therein enabling the filter element provided within such filter to be quickly and efficiently removed while maintaining the filter installed in position and maintaining the position of members adjoining such filter intact.

Other details, uses, and advantages of this invention will become apparent as the following description of the embodiments thereof presented in the accompanying drawings proceeds.

BRIEF DESCRIPTION OF THE DRAWINGS

The accompanying drawings show a present preferred embodiment of this invention, in which FIG. 1 is a perspective view illustrating a pair of fluid filters or filter assemblies of this invention installed in position in parallel flow relation;

FIG. 2 is a view of the filter assemblies of FIG. 1 with parts in section and parts broken away illustrating such filter assemblies operating in a simultaneous manner to filter a fluid;

FIG. 3 is a view similar to FIG. 2 and illustrating the ease with which the head assembly comprising the left filter assembly, as viewed in FIG. 3, may be removed for quick and easy removal of the filter element contained within the left filter assembly and also illustrating the arrangement of selector valves used in association with the two filter assemblies to assure the operating fluid is filtered through the right filter assembly during removal of the left filter element;

FIG. 4 is a view similar to FIG. 2 illustrating the manner in which the right filter assembly may be backwashed while maintaining filtering action through the left filter;

FIG. 6 is a view with parts in section and parts broken away illustrating the arrangement of the two filter assemblies of FIG. 1 and the manner in which the filter assemblies are fastened together in an operating system which enables filtration through one or both of the filters at all times without requiring the filtering system to be shut down.

DESCRIPTION OF ILLUSTRATED EMBODIMENT

Figure 5:
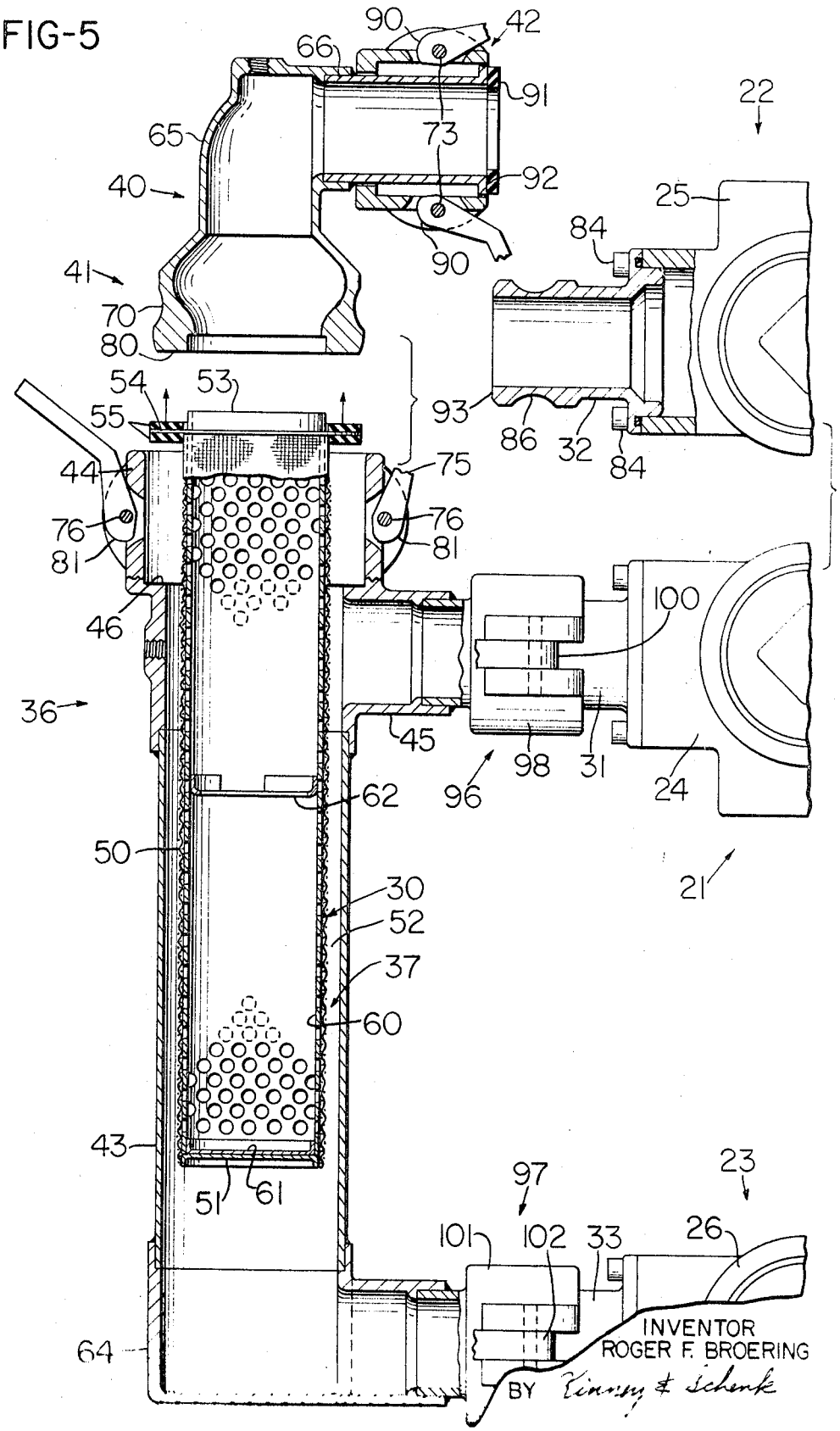
FIG. 5 is an enlarged exploded view with parts in section and parts broken away particularly illustrating the relative positions of component parts of the left filter assembly, as viewed in FIG. 1.

Reference is now made to FIG. 1 of the drawings wherein a pair of fluid filter assemblies or fluid filters each designated generally by the same reference numeral 20 are illustrated. The filter assemblies 20 are connected to a common inlet manifold means 21, an outlet manifold means 22, and a manifold means 23 which is used to backwash the filters in a manner which will be described in detail subsequently.

The manifold means or manifolds 21, 22 and 23 have substantially identical selector valves provided therein as an integral part thereof; however, for easy reference thereto such selector valves will be designated by the reference numerals 24, 25, and 26 and provided in association with manifold means 21, 22, and 23 respectively. The porting arrangement of the selector valves 24–26 is such that the filter assemblies 20 may be operated in parallel as seen in FIG. 2, or one filter may be operated while the other filter is being backwashed as seen in FIG. 4, and similarly one filter may be in operation while the filter element of the other filter is being removed for cleaning or replacement thereof as described and as dictated by the particular operating requirements.

Each selector valve 24, 25, and 26 respectively has a pair of associated tubular members or tubular fluid connectors fastened thereto in any suitable manner and extending from its opposite sides. In particular, it will be seen that selector valve 24 has a pair of tubular members or connectors each designated by the same reference numeral 31 fastened thereto and extending from its opposite sides, the selector valve 25 has a pair of tubular members or connectors 32 suitably fastened thereto and extending from its opposite sides, and the selector valve 26 has a pair of tubular members or fluid connectors 33 extending from its opposite sides. The connectors 31, 32, and 33 comprise a portion of the manifold means 21, 22, and 23 respectively.

Inasmuch as the filter assemblies 20 are substantially identical, as previously mentioned, the detailed description will now proceed referring only to the left filter assembly as viewed in FIG. 1 of the drawings; however, it is to be understood that the detailed description of the left filter assembly 20 is fully applicable to the right filter assembly or right filter 20 as well.

Reference is now made to FIGS. 3 and 5 of the drawings for a detailed description of the left filter assembly or filter 20 and it will be seen that the fluid filter 20 comprises an outer member or body designated generally by the numeral 36 which has a fluid chamber designated generally by the numeral 37 provided within the outer member 36. A filter element designated generally by the reference numeral 30 extends within the chamber 37 and is supported from one end of outer member 36 in a manner as will be described in detail subsequently.

The filter assembly 20 comprises a head assembly or a head designated generally by the numeral 40 which has a first quick coupling means provided at its inner end and designated generally by the numeral 41 for coupling the inner end of the head assembly 40 to the outer member or body 36. The head assembly 40 also has a second quick coupling means designated by the numeral at 42 for coupling the outer end of the head assembly 40 to an associated tubular member which in this example comprises tubular connector 32.

The quick coupling means or couplers 41 and 42 enable the head assembly to be uncoupled and lifted away from its adjoining members, namely outer member or body 36 and tubular member or sleeve 32 while maintaining the positions of such members 36 and 32 intact and without disturbing the remainder of the filter assembly 20. This removal of head assembly 40 is illustrated in FIGS. 3 and 5 of the drawings and it will be appreciated that by uncoupling the quick coupling means 41 and 42 it is a simple matter to lift the head assembly 40 away in a direction substantially transverse to sleeve 32 and remove the filter element 30 from within the outer member 36 for cleaning in a suitable solvent, for example, or for replacement of such filter 30 in the event it is clogged in such a manner that it cannot be satisfactorily cleaned or it is otherwise unsuitable for further use as a filtering element because of damage thereto, or the like.

The outer member 36 in this example of the invention is comprised of a cylindrical shell 43 which is of substantially right circular cylindrical outline and which has a T connector which will be referred to as a T 44 fixed thereto and defining the discharge end of the filter assembly 20. The T 44 may be fixed to the cylindrical shell 43 in any suitable manner; however, in this example of the invention such T is shown as being welded to the cylindrical shell 43.

The T 44 is fixed to cylindrical shell 43 so that its lateral leg designated by the numeral 45 is arranged transverse, i.e. perpendicular, to the longitudinal axis of the shell 43. The T 44 has a support shown in the form of an annular supporting ledge 46 provided therein and support ledge 46 is arranged outwardly of the lateral leg portion 45 of the T 44.

The filter element 30 in this example of the invention is shown in the form of a substantially right circular cylindrical screen-like portion designated by the numeral 50 which is smaller in diameter than the diameter of the cylindrical shell 43 and for reasons which will be described in detail subsequently. Cylindrical filtering portion 50 of this example of the invention has a solid bottom 51 provided at its lower end and suitably fastened thereto as by welding so that the entire filtering action takes place by fluid entering the filter element 30 by flowing through the lateral leg portion 45 of T 44 and in the annular space 52 provided between shell 43 and cylindrical element portion 50, then radially inwardly through the cylindrical portion 50 toward the center of the filter element 30, and then vertically outwardly through the open end of the filter element 30 designated by the numeral at 53.

The filtering or filter element 30 has an annular flange 54 suitably fixed thereto adjacent its open end 53 and the annular flange 54 is adapted to be received within the T 44 and supported on the annular ledge 46 so that the entire filter element 30 is supported within the outer member 36 substantially from one end thereof shown as the top end with the filter 20 arranged as viewed in FIG. 1 of the drawings.

The filter assembly 20 has a pair of substantially flat annular seals or gaskets each designated by the same reference numeral 55 which are adapted to be arranged above and below the annular flange 54 to provide a fluid-tight seal between the outer member 36 and the head assembly 40.

The filter element 30 in this exemplary embodiment of the invention has a core 60 which is inserted therewithin and assures that the cylindrical filtering portion 50 of element 30 will not collapse radially inwardly during the process of filtering fluid through the filter 20. The core 60 has a right circular cylindrical portion corresponding to the configuration of cylindrical portion 50 and fits snugly within the inside surface of cylindrical portion 50. The core 60 also has a solid bottom 61 which adjoins the solid bottom 51 of the outer filtering portion 50 of filter element 30 and the cylindrical portion of core 60 has a large number of openings so as not to obstruct flow therethrough. The central core 60 also has at least one supporting flange 62 provided substantially along the central portion thereof to provide added reinforcement and increased hoop strength for the core 60 and the support flange 62 is of a web-like construction allowing flow substantially axially along the core 60 and upwardly out of the filter assembly 30 in an essentially unobstructed manner.

The outer member 36 also has a fluid connector designated by the numeral 64 suitably fixed to the lower end thereof as by welding. The connector 64 of this example is shown as a substantially L-shaped connector.

The head assembly 40 of filter 20 is constructed and arranged and suitably fastened in position by the couplings 41 and 42 so that it may be quickly and easily coupled to allow fluid flow through the filter 20 and readily uncoupled simply by uncoupling the couplings 41 and 42 and lifting the head assembly 40 away from the adjoining structure.

The detailed description will now proceed with a detained description of the head assembly 40 which comprises the filter 20 of this invention. The head assembly 40 has a pair of leg portions 65 and 66 arranged to define a substantially L-shaped outlet passage for the filter assembly 20.

The head assembly 40 has cam groove means shown as a cam groove 70 provided in its vertically arranged leg portion 65 and a sleeve 71 which is supported on its horizontal leg portion 66. The sleeve 71 has cooperating cam lever means shown as a pair of cam levers each designated by the numeral 72 and each cam lever 72 is pivotally mounted on a pivot pin 73 which is provided on the sleeve 71. The cam levers 72 are shown rotated 90 degrees from their correct positions in FIGS. 5 and 6 to better illustrate the manner in which they operate. The cam groove 70 provided on leg portion 65 comprises a portion of the first coupling means 41 previously mentioned and the sleeve 71 and cam levers 72 comprise a portion of the quick coupling means 42 previously mentioned.

The T 44 has cam lever means shown as a pair of cam levers 75 each pivotally mounted about an associated pivot pin 76 provided on the upper end portion of the T 44. The cam levers 75 are illustrated rotated 90 degrees from their correct positions in FIG. 5 of the drawings to better illustrate the manner in which they operate; however, it is to be understood that normally such cam levers 75 are in the position illustrated in FIG. 1 of the drawings.

To fasten the inner end portion of the head assembly 40 to the outer member 36 of filter assembly 20 the filter element 30 and its associated components including gaskets 55 are inserted within the outer member 36 and so that each gasket 55 is arranged on an associated side of the flange 54 comprising filter element 30. The inner end of the head assembly 40 is then moved so that an annular bearing surface 80 comprising the inner terminal end of the leg portion 65 engages the outermost gasket 55 with the filter element in position.

The cam levers 75 are then pivoted about their pivot pins 76 so that the cam surface means 81 provided in each cam lever 75 engages surface means defining groove 70 in leg portion 65 of head assembly 40 to firmly lock the head assembly 40 in position. In addition, upon rotating the cam levers 75 in position the cam surfaces 81 also move the head assembly 40 more firmly toward the outer member 36 and thereby yieldingly clamp the support flange 54 firmly against supporting ledge 46 while yieldingly compressing the gaskets 55 to provide an improved seal between the inner end portion of the head assembly 40 and the outer member or body portion 36 of the filter assembly 20.

The sleeve 71 provided on the horizontally arranged leg portion of head assembly 40 is shown in FIGS. 5 and 6 as being rotated 90 degrees to highlight the action of the cam levers 72 supported thereon as previously mentioned. Thus, the cam levers 72 cooperate with their associated tubular member 32, which is suitably fastened by bolts 84 to the selector valve 25, to fasten the outer end of head assembly to outer member or sleeve 32. The sleeve 32 has cam groove means 86 provided therein and the cam groove 86 cooperates with the cam surface means or a cam surface 90 provided on each cam lever 72 to provide means for quickly coupling and uncoupling the outer end portion of the head assembly 40 to the tubular member or sleeve 32. The cam levers 72 and associated cam surface means 90 are adapted to be pivoted in position so as to engage the surface of sleeve 32 defining cam groove 86 and thereby define the coupling means 42 previously mentioned.

The filter assembly 20 also has an annular gasket 91 which is adapted to be clamped between the terminal end 92 of the leg portion 66 and the terminal end 93 of sleeve 32 in a fluid-tight manner. Upon pivoting the cam levers 72 in position within their associated cam groove 86 it will be appreciated that the annular gasket 91 is also yieldingly compressed in much the same manner as the annular flat gaskets 55 to provide a fluid-tight seal at the outer end of head assembly 40.

Thus it will be appreciated that it is a simple matter to remove the head assembly 40 from its associated filter assembly 20 and this is achieved simply by rotating the cam levers 72 and 75 in their proper directions to uncouple the head assembly 40. With the head assembly thus uncoupled the sleeve 71 is then simply moved from the position shown by solid lines at 94 in FIG. 6 to the position shown by dotted lines at 95. With this arrangement it is then a simple matter to merely lift the head assembly 40 substantially vertically upwardly in a direction substantially transverse to its leg portion 66. This enables the filter element 30 and its associated components to be lifted out as shown in FIG. 3 for cleaning and replacement.

In this example of the invention the head assembly 40 is shown as being substantially L-shaped and having an axially movable sleeve 71 provided in association with its horizontal leg portion 66 and with a groove 70 provided in association with vertical leg portion 65. However, it will be appreciated that the head assembly 40 may be provided with grooves in both of its leg portions and in such an instance a telescoping sleeve may be provided in association with a suitable member substituted for member 32 so that the head assembly 40 could be similarly lifted away from the filter assembly 20 in an unobstructed manner. Also, it may be desirable in some applications of this invention to provide a pair of telescoping sleeves similar to sleeve 71 on head assembly 40 wherein the additional sleeve may be provided on vertical leg portion 65. In this latter instance it will be appreciated that an associated cooperating groove similar to groove 70 would be provided on the outer portion of body 36.

The filter assemblies 20 illustrated in FIGS. 1–4 of the drawings enable a versatile filtering operation wherein both filters 20 may be operated simultaneously or one filter may be operated while the other is being either cleaned by backflushing or removed from cleaning or replacement. For example, as seen in FIG. 2 the system is shown with both filter assemblies 20 operating and with a fluid to be filtered entering the selector valve 24 from a suitable source. The fluid then moves through selector valve 24 in opposite directions and through each filter element 30 of each filter assembly 20 and upwardly through each head assembly 40 and through outlet valve 25 to a location requiring filtered fluid.

If it is desired to remove one of the filter elements, shown as a filter element of the left filter 20 in FIG. 3 the selector valve 24 is adjusted so that fluid from the source only flows through the right filter assembly 20 and out through the selector valve 25. The lower selector valve 26 in this instance is turned to provide a dead end at the lower end of the right filter 20. The head assembly 40 may then be removed from the left filter assembly 20 as previously explained in detail. Obviously, the right filter assembly may be replaced by operating the left filter assembly in a similar manner as shown in FIG. 3 merely by turning the selector valves 24–26 to their proper positions.

If it is desired to backflush one of the filters, then the selector valves are adjusted accordingly and in the illustration of FIG. 4 it will be seen that selector valves are turned so that the fluid enters the valve 24 and goes only to the left filter assembly 20 for filtration. Some of the filtered fluid flows through the selector valve 25; however, the selector valves have been adjusted so that a portion of the filtered fluid will flow through the right filter assembly 20 in a reverse direction and, in effect, backflush the right filter assembly. The lower selector valve 26 in this instance is rotated so the fluid used for backflushing may flow out of valve 26 and into a suitable receptacle or conduit as desired. Obviously, the left filter assembly 20 could be backflushed in a similar manner after properly adjusting the selector valves 24–26.

The filter assemblies 20 are shown instrumented with suitable gauges which have not been given reference numerals; however, it will be appreciated that the gauges will be used in a fluid system in a known manner to indicate pressures throughout the system.

In addition to providing a filter assembly 20 which enables the head assembly 40 thereof to be removed simply and quickly for maintenance of the filter element 30 it will be appreciated that each filter assembly 20 is connected in the fluid system entirely by quick coupling and uncoupling means. Thus, in addition to quick coupling means 41 and 42 previously described it will be appreciated that similar coupling means are provided in association with the inlet selector valve 24 and the selector valve 26 and such coupling means have been designated generally by the reference numerals 96 and 97 respectively.

A detailed description of the quick coupling means 96 and 97 will not be made inasmuch as they are substantially identical to the coupling means 42 previously described; however, it will be seen from the drawings that the quick coupling means 96 comprises a sleeve 98 provided with cam levers 100 which cooperate with an associated cam groove provided in the sleeve 31. Similarly, the quick coupling means 97 comprises a sleeve 101 provided with cam levers 102 which associate with a cooperating cam groove provided in the sleeve 33. The sleeves 98 and 101 may or may not be axially slidable as desired.

In this example of the invention only two filter assemblies 20 are shown used in parallel flow relation. However, it will be appreciated that any desired number of filter assemblies 20 may be used and connected to the common manifold and each may be provided with suitable valves to enable removal of its filter element 30 to enable quick and easy maintenance thereof.

In the exemplary embodiment of this invention presented in the drawings the leg portion 45 of T 44 and the sleeve 98 are shown as two separate pieces; however, it will be appreciated that leg portion 45 and sleeve 98 may be made as one piece in some applications of this invention, if desired. Similarly, the connector 64 and the sleeve 101 in this example are shown as being made as two separate pieces. Here again, it will be appreciated that connector 64 and sleeve 101 may be made as one piece.

While a present preferred embodiment of this invention has been illustrated and described, it will be recognized that this embodiment is not restrictive but is illustrative only and that this invention may be otherwise variously embodied and practiced.

What is claimed is:

1. A fluid filter comprising, an outer member having a fluid chamber provided therein, a filter element extending within said chamber and being supported from one end of said outer member, and a head assembly having first quick coupling means at its inner end for coupling said head assembly to said outer member and second quick coupling means at its outer end for coupling said head assembly to an associated tubular member, said coupling means enabling said head assembly to be uncoupled and lifted away from its adjoining members while maintaining the positions of said adjoining members intact to provide easy access to said filter element for removal and replacement thereof, said outer member having a support provided therein adjacent said one end, said filter element having a supporting flange fixed thereto and supported on said support, said head assembly having an annular bearing surface which engages said flange and clamps it against said support to hold said filter element in position within said chamber and seal said flange to said outer tubular member and to said head assembly.

2. A fluid filter as set forth in claim 1 in which each of said first and second quick coupling means comprises cam means each coupling its associated end of said head assembly in position as well as moving said head assembly a predetermined increment toward its adjoining member.

3. A fluid filter as set forth in claim 1 further comprising a pair of fluid seals arranged at opposite ends of said head assembly each of said seals being yieldingly compressed by an associated quick coupling means upon coupling thereof to provide an improved fluid-tight seal between said associated quick coupling means and an adjacent member.

4. A fluid filter as set forth in claim 1 in which at least one of said coupling means comprises an annular cam groove provided in said head assembly and a cooperating pivoted cam lever supported by an assocated member said cam lever having a cam surface which is adapted to be pivoted into and out of said cam groove to provide quick coupling and uncoupling respectively.

5. A fluid filter as set forth in claim 1 in which said head assembly has a pair of leg portions arranged to define a substantially L-shaped outlet passage for said fluid filter and one of said quick coupling means comprises a sleeve supported concentrically around one of said leg portions and being adapted to be moved axially along said one leg portion, said sleeve having cam lever means pivotally supported thereon, and said one quick coupling means being coupled by placing said sleeve concentrically around an associated one of said members which has a cooperating cam groove provided therein and moving said cam lever means in a locking position and said one quick coupling means being uncoupled by unlocking said cam lever means and sliding said sleeve along said one leg portion so that it clears said associated member and may be lifted in an unobstructed manner in a direction substantially perpendicular to said associated member.

6. A fluid filter as set forth in claim 1 in which said outer member is comprised of a cylindrical shell having a T fixed thereto and defining said one end of said outer member, said T being fixed to said shell so that its lateral leg is arranged transverse to the axis of said shell and said T has an annular supporting ledge provided therein and arranged outwardly of said lateral leg, said filter element comprises a cylindrical element corresponding in configuration to said cylindrical shell and has an annular flange fixed thereto adjacent one end thereof which is supported on said supporting ledge, said head assembly comprises an inner tubular portion defining said inner end, and said inner tubular portion annular bearing surface defining its terminal edge which engages and clamps said annular flange against said supporting ledge to hold said filter element in position in said chamber.

7. A fluid filter as set forth in claim 6 in which, said head assembly has a pair of leg portions arranged to define a substantially L-shaped outlet passage for said fluid filter, one of said leg portions defining said inner tubular portion, and said first quick coupling means comprises a first annular cam groove provided in and concentrically around said inner tubular portion of said head assembly and cooperating first cam lever means pivotally supported by said T, said first cam lever means having first cam surface means adapted to be pivoted into and out of said first cam groove to provide coupling and uncoupling respectively to said first quick coupling means.

8. A fluid filter as set forth in claim 6 and further comprising third quick coupling means provided on said lateral leg of said T for quick coupling and uncoupling of said fluid filter ot a fluid supply and a seal arranged on either side of said annular flange assuring the provision of fluid-tight connection between said head assembly and said outer member.

9. A fluid filter as set forth in claim 8 further comprising a fluid connector fixed to the end of said cylindrical shell opposite said one end and a fourth quick coupling means provided on said fluid connector, said quick coupling means enabling quick and easy installation and removal of the entire filter from an associated fluid system.

10. A fluid filter as in claim 1 wherein, inlet and outlet fluid conduit means are joined in fluid communication by first and second conduit means arranged in parallel flow relationship between said inlet and outlet conduit means, and said filter is in at least one of said first and second conduit means, and flow control means in said conduit means for selectively controlling flow through said first and second conduit means to selectively establish and disestablish fluid flow therethrough so that said filter may be removed and replaced while maintaining fluid flow through one of said first and second conduit means and said inlet and outlet conduit means.

11. A fluid filter as in claim 10 wherein, one of said filters is provided in each of said first and second conduit means.

12. A fluid filter as in claim 11 wherein, a second outlet conduit means is provided in fluid communication with each of said first and second conduit means and flow control means is provided in said conduit means for regulating flow between said first and second conduit means and said outlet so that flow may be established between said inlet and said outlet through at least one of said first and second conduit means to backwash said filters.

References Cited

UNITED STATES PATENTS

| 1,223,299 | 4/1917 | Taylor | 210—452 |
| 3,300,235 | 1/1967 | Blackwell | 285—326 X |
| 3,240,342 | 3/1966 | Callahan et al. | 210—450 X |

FOREIGN PATENTS

| 683,117 | 10/1939 | Germany. | |

REUBEN FRIEDMAN, Primary Examiner

T. A. GRANGER, Assistant Examiner